US007489453B2

(12) United States Patent
Chinniah et al.

(10) Patent No.: US 7,489,453 B2
(45) Date of Patent: Feb. 10, 2009

(54) SIDE EMITTING NEAR FIELD LENS

(75) Inventors: Jeyachandrabose Chinniah, Canton, MI (US); Amir P. Fallahi, W. Bloomfield, MI (US); Jeffrey Allen Erion, Plymouth, MI (US); Edwin Mitchell Sayers, Saline, MI (US); Thomas Lee Jones, Commerce Township, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 375 days.

(21) Appl. No.: 11/274,071

(22) Filed: Nov. 15, 2005

(65) Prior Publication Data

US 2007/0109791 A1 May 17, 2007

(51) Int. Cl.

*G02B 17/00* (2006.01)
*G02B 3/02* (2006.01)
*F21V 5/00* (2006.01)
*F21V 5/04* (2006.01)

(52) U.S. Cl. ....................... 359/727; 359/726; 359/718; 362/326; 362/327; 362/328; 362/333; 362/334; 362/335

(58) Field of Classification Search ................. 359/718, 359/726, 727, 708; 362/333, 326–328, 334–336
See application file for complete search history.

(56) References Cited

U.S. PATENT DOCUMENTS 2,215,900 A 9/1940 Bitner
2,224,178 A 12/1940 Bitner
2,254,961 A 9/1941 Harris
2,254,962 A 9/1941 Harris et al.
2,387,816 A 10/1945 Wagner
3,593,014 A 7/1971 Vesely
3,700,883 A 10/1972 Donohue et al.
4,344,110 A 8/1982 Ruediger
4,389,698 A 6/1983 Cibie
4,577,260 A 3/1986 Tysoe
4,613,927 A 9/1986 Brandt
4,642,740 A 2/1987 True (Continued)

FOREIGN PATENT DOCUMENTS

DE 3317519 A1 11/1948

(Continued)

OTHER PUBLICATIONS

Product Brochure—THE LED LIGHT.com; Luxeon LEDs, Assemblies, and Accessories; pp. 1-4, Jul. 27, 2005.

(Continued)

*Primary Examiner*—William C Choi
*Assistant Examiner*—Jack Dinh
(74) *Attorney, Agent, or Firm*—Brinks Hofer Gilson & Lione

(57) ABSTRACT

A near field lens for an automotive light assembly which has a reduced thickness. Generally, the near field lens includes a main body of light transmitting material. A pocket is formed in the main body for receiving light from a light source. The pocket is defined by an inner radially facing surface and an inner axially facing surface. The inner radially facing surface is structured to reduce the thickness of the lens.

22 Claims, 5 Drawing Sheets

U.S. PATENT DOCUMENTS

| | | | |
|---|---|---|---|
| 4,704,661 | A | 11/1987 | Kosmatka |
| 4,753,520 | A | 6/1988 | Silverglate |
| 4,770,514 | A | 9/1988 | Silverglate |
| 4,826,273 | A | 5/1989 | Tinder et al. |
| 4,927,248 | A | 5/1990 | Sakakibara et al. |
| 4,958,263 | A | 9/1990 | Davenport et al. |
| 4,972,302 | A | 11/1990 | Masuyama et al. |
| 5,042,928 | A | 8/1991 | Richards |
| 5,081,564 | A | 1/1992 | Mizeguchi et al. |
| 5,161,059 | A | 11/1992 | Swanson et al. |
| 5,184,883 | A | 2/1993 | Finch et al. |
| 5,276,594 | A | 1/1994 | Burkett et al. |
| 5,311,410 | A | 5/1994 | Hsu et al. |
| 5,343,330 | A | 8/1994 | Hoffman et al. |
| 5,369,554 | A | 11/1994 | Erion |
| 5,434,756 | A | 7/1995 | Hsu et al. |
| 5,440,456 | A | 8/1995 | Bertling et al. |
| 5,485,317 | A | 1/1996 | Perissinotto et al. |
| 5,526,190 | A | 6/1996 | Hubble, III et al. |
| 5,532,909 | A | 7/1996 | Ban et al. |
| 5,567,031 | A | 10/1996 | Davenport et al. |
| 5,577,492 | A | 11/1996 | Parkyn, Jr. et al. |
| 5,608,290 | A | 3/1997 | Hutchisson et al. |
| 5,642,933 | A | 7/1997 | Hitora |
| 5,757,557 | A | 5/1998 | Medvedev et al. |
| 5,775,792 | A | 7/1998 | Wiese |
| 5,813,743 | A | 9/1998 | Naka |
| 5,898,267 | A | 4/1999 | McDermott |
| 5,914,760 | A | 6/1999 | Daiku |
| 5,931,576 | A | 8/1999 | Kreysar et al. |
| 5,947,587 | A | 9/1999 | Keuper et al. |
| 6,007,226 | A | 12/1999 | Howard |
| 6,075,652 | A | 6/2000 | Ono et al. |
| 6,097,549 | A | 8/2000 | Jenkins et al. |
| 6,123,440 | A | 9/2000 | Albou |
| 6,129,447 | A | 10/2000 | Futami |
| 6,139,147 | A | 10/2000 | Zhang |
| 6,152,588 | A | 11/2000 | Scifres |
| 6,164,799 | A | 12/2000 | Hirmer et al. |
| 6,168,302 | B1 | 1/2001 | Hulse |
| 6,191,889 | B1 | 2/2001 | Maruyama |
| 6,206,554 | B1 | 3/2001 | Schuster et al. |
| 6,283,623 | B1 | 9/2001 | Chinniah et al. |
| 6,292,293 | B1 | 9/2001 | Chipper |
| 6,305,830 | B1 | 10/2001 | Zwick et al. |
| 6,327,086 | B1 | 12/2001 | Unno |
| 6,334,702 | B1 | 1/2002 | Albou |
| 6,352,359 | B1 | 3/2002 | Shie et al. |
| 6,356,394 | B1 | 3/2002 | Glienicke |
| 6,367,950 | B1 | 4/2002 | Yamada et al. |
| 6,367,954 | B1 | 4/2002 | Futami |
| 6,367,957 | B1 | 4/2002 | Hering et al. |
| 6,402,355 | B1 | 6/2002 | Kinouchi |
| 6,431,738 | B1 | 8/2002 | Kondo et al. |
| 6,447,155 | B2 | 9/2002 | Kondo et al. |
| 6,454,443 | B2 | 9/2002 | Natsume et al. |
| 6,462,874 | B1 | 10/2002 | Soskind |
| 6,481,864 | B2 | 11/2002 | Hosseini et al. |
| 6,527,411 | B1 | 3/2003 | Sayers |
| 6,536,918 | B1 | 3/2003 | Boroczki et al. |
| 6,543,923 | B2 | 4/2003 | Tamai |
| 6,547,423 | B2 | 4/2003 | Marshall et al. |
| 6,560,038 | B1 | 5/2003 | Parkyn, Jr. et al. |
| 6,604,843 | B2 | 8/2003 | Shpizel |
| 6,616,299 | B2 | 9/2003 | Martineau |
| 6,616,305 | B1 | 9/2003 | Simon |
| 6,623,132 | B2 | 9/2003 | Lekson et al. |
| 6,626,565 | B2 | 9/2003 | Ishida |
| 6,679,618 | B1 | 1/2004 | Suckow et al. |
| 6,698,908 | B2 | 3/2004 | Sitzema, Jr. et al. |
| 6,724,543 | B1 | 4/2004 | Chinniah et al. |
| 6,726,346 | B2 | 4/2004 | Shoji |
| 6,755,556 | B2 | 6/2004 | Gasquet et al. |
| 6,757,109 | B2 | 6/2004 | Bos |
| 6,783,269 | B2 | 8/2004 | Pashley et al. |
| 6,805,456 | B2 | 10/2004 | Okuwaki |
| 6,807,019 | B2 | 10/2004 | Takeuchi et al. |
| 6,814,475 | B2 | 11/2004 | Amano |
| 6,814,480 | B2 | 11/2004 | Amano |
| 6,819,505 | B1 | 11/2004 | Cassarly et al. |
| 6,819,506 | B1 | 11/2004 | Taylor et al. |
| 6,824,284 | B2 | 11/2004 | Chinniah et al. |
| 6,899,443 | B2 | 5/2005 | Rizkin et al. |
| 6,910,783 | B2 | 6/2005 | Mezei et al. |
| 2002/0008969 | A1 | 1/2002 | Mabuchi et al. |
| 2002/0080615 | A1 | 6/2002 | Marshall et al. |
| 2002/0093820 | A1 | 7/2002 | Pederson |
| 2002/0126400 | A1 | 9/2002 | Muller-Rissmann et al. |
| 2002/0136022 | A1 | 9/2002 | Nakata |
| 2002/0167820 | A1 | 11/2002 | Haering et al. |
| 2002/0172052 | A1 | 11/2002 | Perlo et al. |
| 2003/0007359 | A1 | 1/2003 | Sugawara et al. |
| 2003/0067784 | A1 | 4/2003 | Erber |
| 2003/0075167 | A1 | 4/2003 | Minano Dominguez et al. |
| 2003/0099113 | A1 | 5/2003 | Gebauer et al. |
| 2003/0123159 | A1 | 7/2003 | Morita et al. |
| 2003/0123262 | A1 | 7/2003 | Suehiro et al. |
| 2003/0218882 | A1 | 11/2003 | Wirth et al. |
| 2003/0235046 | A1 | 12/2003 | Chinniah et al. |
| 2003/0235050 | A1 | 12/2003 | West et al. |
| 2004/0012976 | A1 | 1/2004 | Amano |
| 2004/0070855 | A1 | 4/2004 | Benitez et al. |
| 2004/0109326 | A1 | 6/2004 | Uhl |
| 2004/0114393 | A1 | 6/2004 | Galli |
| 2004/0120157 | A1 | 6/2004 | Bottesch et al. |
| 2004/0130904 | A1 | 7/2004 | Yamada et al. |
| 2004/0141323 | A1 | 7/2004 | Aynie et al. |
| 2004/0145899 | A1 | 7/2004 | Riebling et al. |
| 2004/0150991 | A1 | 8/2004 | Ouderkirk et al. |
| 2004/0179349 | A1 | 9/2004 | Buelow, II et al. |
| 2004/0202003 | A1 | 10/2004 | Lyst, Jr. |
| 2004/0212998 | A1 | 10/2004 | Mohacsi |
| 2004/0218392 | A1 | 11/2004 | Leadford |
| 2004/0257827 | A1 | 12/2004 | Ishida et al. |
| 2004/0264199 | A1 | 12/2004 | Shu et al. |
| 2005/0007753 | A1 | 1/2005 | Van Hees et al. |
| 2005/0024744 | A1 | 2/2005 | Falicoff et al. |
| 2005/0057938 | A1 | 3/2005 | Mertens et al. |
| 2005/0078483 | A1 | 4/2005 | Bernard et al. |
| 2005/0083699 | A1 | 4/2005 | Rhoades et al. |

FOREIGN PATENT DOCUMENTS

| | | | |
|---|---|---|---|
| DE | 20206829 | U1 | 10/2002 |
| DE | 10329185 | A1 | 1/2005 |
| JP | 05205511 | | 8/1993 |
| JP | 06260006 | | 9/1994 |
| JP | 02001257381 | | 9/2001 |
| WO | WO 89/08223 | | 8/1989 |

OTHER PUBLICATIONS

Product Brochure—Carclo Precision Optics; Led Optics; 2 Pages.
DE 3317519 A1—English Abstract—Published Nov. 15, 1948.
JP05205511—English Abstract—Published Aug. 13, 1993.
JP06260006—English Abstract—Published Sep. 16, 1994.
JP02001257381—English Abstract—Published Sep. 21, 2001.
WO 89/08223—English Abstract—Published Aug. 9, 1989.

SIDE EMITTING NEAR FIELD LENS

FIELD OF THE INVENTION

The present invention relates generally to automotive light modules having near field lenses collecting and directing light from sources such as light emitting diodes.

BACKGROUND OF THE INVENTION

Light emitting diodes (LED's) are fast becoming the preferable light source for automotive lighting applications, as they consume less power but provide light output which is acceptable for such applications. Near field lenses (NFL's) are used to collect as well as to collimate the light from a LED source, and generally provide high light collection efficiency (typically 70-90%), but the output beam size for a given source depends on the size of the lens. The larger the lens size (i.e. the larger the starting focal length of the lens), the smaller of the output beam size and the higher the peak intensity. However, manufacturing larger lenses poses complex molding issues and takes higher molding cycle time, thus requiring expensive molding tools and processes.

Accordingly, there exists a need to provide a lighting assembly having a lens that provides the output beam size and peak intensity for automotive applications, while reducing the size of the NFL.

BRIEF SUMMARY OF THE INVENTION

One embodiment of the present invention provides a near field lens which reduces the size of the near field lens. Generally, the near field lens includes a main body of light transmitting material and a pocket formed in the main body for receiving light from the light source. The main body defines an outer longitudinally facing surface and an outer laterally facing surface. The outer longitudinally facing surface is structured to redirect light along the lateral axis towards the outer laterally facing surface. The pocket is defined by an inner longitudinally facing surface and an inner laterally facing surface. The inner longitudinally facing surface is curved towards the pocket.

According to more detailed aspects, the lens collimates light longitudinally relative to the longitudinal axis. The lens also collimates light vertically relative to a vertical axis (the longitudinal, lateral and vertical axes being mutually perpendicular). The inner longitudinally facing surface is structured to refract light towards the outer longitudinally facing surface. The inner longitudinally facing surface is curved between an upstream point and a downstream point, a tangent of the curve at the downstream point being generally parallel to the lateral axis. The inner longitudinally facing surface preferably follows a circular arc. The inner laterally facing surface is also curved towards the pocket and is preferably structured as a lens to longitudinally collimate light from the pocket. The outer laterally facing surface is generally parallel to the longitudinal axis. In one embodiment, the main body includes a central hub which permits some light to pass longitudinally therethrough.

In another embodiment of a NFL constructed in accordance with the teachings of the present invention, the main body includes a first body portion and a second body portion which each direct light along the lateral axis but in opposite directions. The first and second body portions are preferably mirrored about the longitudinal axis. Thus, the first and second body portions each define inner longitudinally facing surface portions which in combination form the inner longitudinally facing surface, and likewise each define inner laterally facing surface portions which in combination form the inner laterally facing surface. As such, the inner longitudinally facing surface has a compound curvature and the inner laterally facing surface has a compound curvature.

In yet another embodiment of a NFL constructed in accordance with the teachings of the present invention, the main body is disc shaped and represents a revolution of the cross-sectional shape about the longitudinal axis. Here, the main body defines a vertical axis mutually perpendicular to the longitudinal and lateral axes, in the main body emits light in both the lateral and vertical directions. That is, light is emitted over 360 degrees relative to the longitudinal axis, and the outer laterally facing surface is annular.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
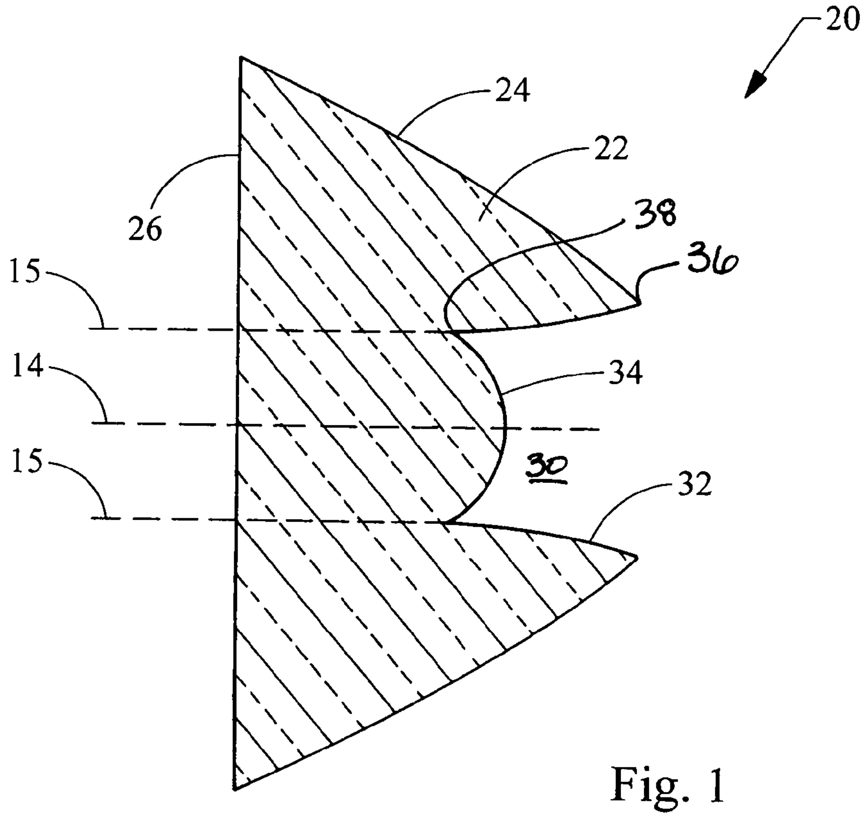
FIG. 1 is a cross-sectional view of a near field lens used as the reference in forming the near field lenses depicted in the remainder of the figures.

Turning now to the figures, FIG. 1 depicts an axial near field lens 20 having a reduced thickness as measured in the longitudinal direction along axis 14, the details of which may be found in co-pending U.S. patent application Ser. No. 11/252,008 filed Oct. 17, 2005, and which is incorporated herein by reference in its entirety. The near field lens 20 will be used as a reference in describing the construction of the near field lenses 40, 140, 240, 340 described below in accordance with the teachings of the present invention. As shown in FIG. 1, the NFL 20 includes a main body 22 defining a longitudinal axis 14. The NFL 20 collects, collimates and redirects light downstream along the axis 14. The main body 22 generally includes an outer laterally facing surface 24 which redirects light towards an outer longitudinally facing surface 26 through which light is emitted. A pocket 30 is formed in the main body 22 for receiving light from a light source. The pocket 30 is generally defined by an inner laterally facing surface 32 and an inner longitudinally facing surface 34. The inner longitudinally facing surface 34 is curved and preferably structured as a lens to collimate the light and direct the same longitudinally through outer longitudinally facing surface 26.

The inner radially facing surface 32 is curved to refract light towards the outer laterally facing surface 24. Specifically, the inner radially facing surface 32 is curved in a manner that permits reduction in the thickness of the NFL 20. The surface 32 is curved between an upstream point 36 and a downstream point 38, and in the depicted embodiment is curved over its entire surface. A tangent 15 to the curvature of the inner radially facing surface 32, taken at the downstream point 38, runs generally parallel to the longitudinal axis 14. By the term generally, it is meant that the tangent 15 and axis 14 are parallel within 1 degree of each other. The inner radially facing surface 32 is preferably curved to follow a circular arc. Further details of the NFL 20 may be found in U.S. patent application Ser. No. 11/252,008 as noted above.

Figure 2:
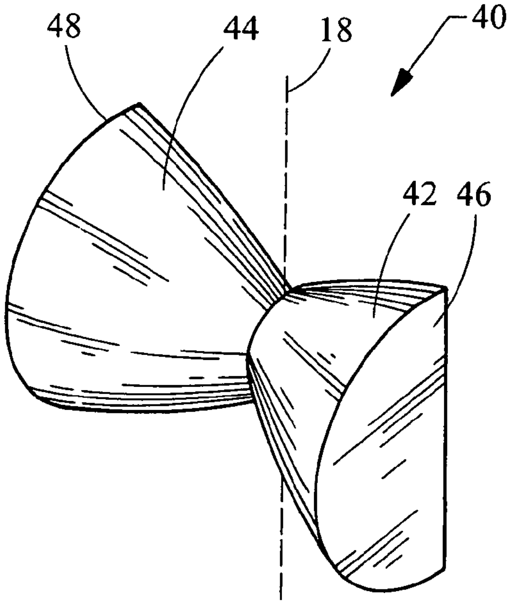
FIG. 2 is perspective view of a near field lens constructed in accordance with the teachings of the present invention.
Figure 3:
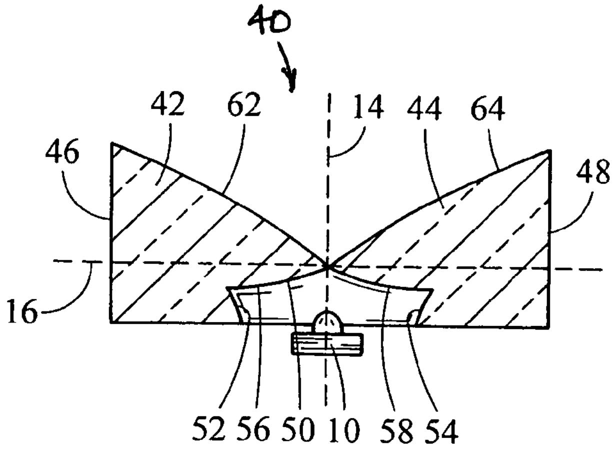
FIG. 3 is a cross-sectional view of the near field lens depicted in FIG. 2.

Turning now to FIGS. 2 and 3, a near field lens 40 is shown constructed in accordance with the teachings of the present invention. Generally, the NFL 40 comprises a first body portion 42 and a second body portion 44 constructed of a light transmitting material, and preferably a plastic such as acrylic. The first and second body portions 42, 44 generally aligned along a lateral axis 16. The first and second body portions 42, 44 define outer laterally facing surfaces 46, 48 through which light is directed in opposite directions along the lateral axis 16. This bi-directional NFL 40 has a construction generally corresponding to the NFL 20 depicted in FIG. 1 being split down the center in two equal halves, and the upstream edges 36 of the pocket 30 being fitted together to define the single pocket 50 depicted in FIG. 3. Stated another way, one half of the cross-section depicted in FIG. 1 (cut by longitudinal axis 14) has been rotated 90 degrees, mirrored about the longitudinal axis 14, and then revolved over 180 degrees about the lateral axis 16. A vertical axis 18 is therefore also defined, as shown in FIG. 2.

As best seen in FIG. 3, the first body portion 42 also defines an outer longitudinally facing surface 62, and similarly the second body portion 44 defines an outer longitudinally facing surface 64. The outer longitudinally facing surfaces 62, 64 are structured to collimate the light longitudinally and vertically, and to redirect the light towards the outer laterally facing surfaces 46, 48. The pocket 50 is defined by four surfaces. The first body portion 42 defines an inner laterally facing surface 52 and an inner longitudinally facing surface 56. Likewise, the second body portion 44 defines an inner laterally facing surface 54 and an inner longitudinally facing surface 58. Accordingly, the inner longitudinally facing surface portions 56, 58 in combination form the inner longitudinally facing surface, and likewise the inner laterally facing surface portions 52, 54 in combination define the inner laterally facing surface. As such, it can be seen that the inner longitudinally facing surface is formed by a compound curvature defined by the inner longitudinally facing surface portions 56, 58.

Generally, light from light source 10 enters the pocket 50. A portion of light is refracted by inner laterally facing surfaces 52, 54, and hence longitudinally collimated and vertically collimated and directed laterally downstream through outer laterally facing surfaces 46, 48. The remainder of the light is refracted by inner longitudinally facing surface portions 56, 58 towards the outer longitudinally facing surface portion 62, 64, which in turn collimates and redirects the light laterally along the lateral axis through outer laterally facing surfaces 46, 48.

Accordingly, it will be recognized that the near field lens 40 has a reduced lateral thickness (measured along the lateral axis 16) due to the construction of the inner longitudinally facing surface portions 56, 58, which are preferably constructed in accordance with the teachings of the inner laterally facing surface 32 described above with reference to FIG. 1. Thus, the NFL 40 has a reduced lateral thickness while providing a suitable beam pattern, such as for automotive applications. Further, the lateral thickness of the NFL 40 may be reduced without an increase in the longitudinal height (measured along the longitudinal axis 14) of the NFL 40. This reduces the amount of material needed to form the main body 42, decreases manufacturing time and eliminates expensive molding tools and processes, while providing an output beam size and peak intensity suitable for automotive applications.

Figure 4:
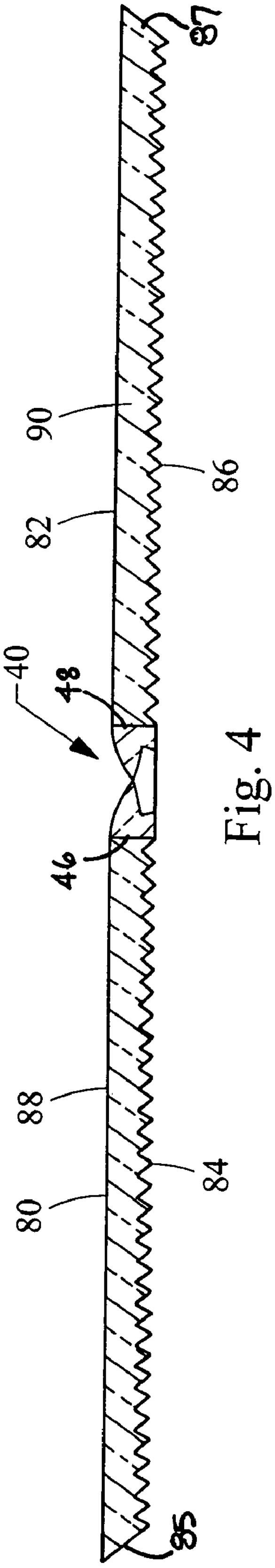
FIG. 4 is a cross-sectional view of the near field lens depicted in FIGS. 2 and 3, shown applied to a light manifold.
Figure 5:
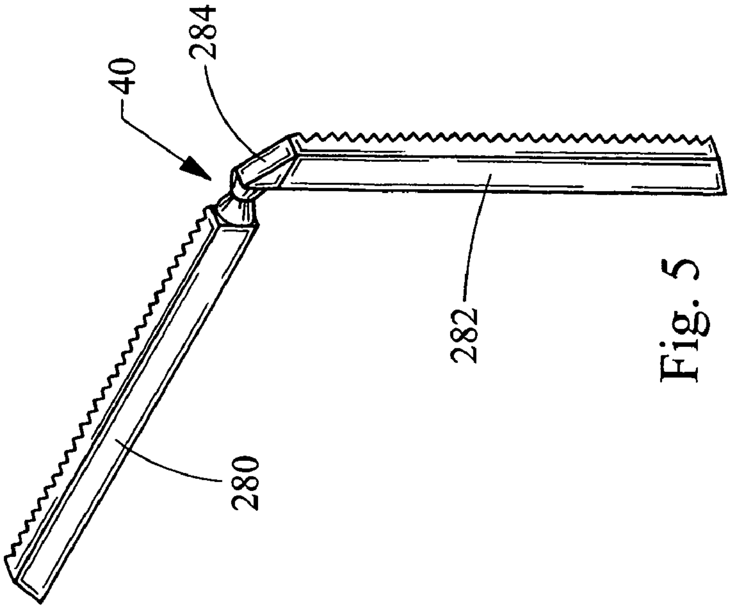
FIG. 5 is a perspective view of the lens depicted in FIGS. 2 and 3 shown applied to another light manifold.

FIGS. 4 and 5 illustrate the NFL 40 applied to various manifolds for producing certain light distribution. In FIG. 4, the NFL 40 has a first manifold 80 connected to its first outer laterally facing surface 46, and a second manifold 82 connected to its second outer laterally facing surface 48. As previously discussed, the NFL 40 redirects light in two opposite directions along the lateral axis 16, which is redirected by angled end surfaces 87 in the longitudinal direction. The manifolds 80, 82 include a lower serrated surface 84, 86 and an upper surface 88, 90. The upper surface 88, 90 has been depicted as generally flat, although the surfaces could include beam focusing or spreading optics or any other optics to achieve a particular lighting function. The serrated lower edges 84, 86 collect incident light and redirect the same through the upper light emitting surface 88, 90. FIG. 5 depicts a similar arrangement having the NFL 40 connected to opposing manifolds 280, 282. Here, however, a redirecting member 284 has been shown connected to the second laterally outer laterally facing surface 48 and redirects the light 90 degrees relative to the lateral axis, which here is along the vertical axis 18. Accordingly, it will be recognized by those skilled in the art that through the use of a bi-directional NFL 40, in combination with any number of manifolds and light redirecting members, numerable light distribution patterns can be generated to meet particular light distribution functions.

Figure 6:
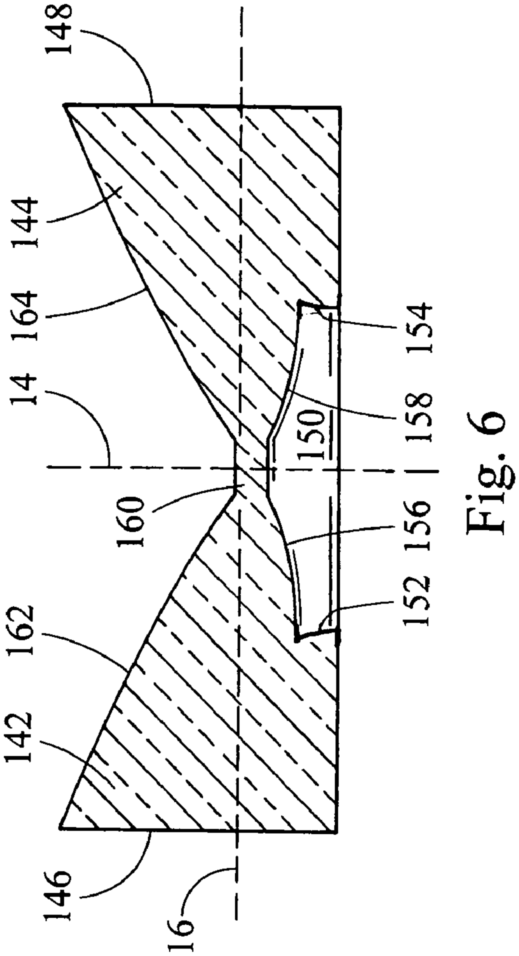
FIG. 6 is a cross-sectional view of another near field lens constructed in accordance with the teachings of the present invention.

Turning now to FIG. 6, another embodiment of a near field lens 140 is depicted. As with the embodiment described in FIGS. 2 and 3, the NFL 140 includes a first body portion 142 and a second body portion 144 each including an outer longitudinally facing surface 162, 164, an outer laterally facing surface 146, 148, an inner longitudinally facing surface 156, 158 and an inner laterally facing surface 152, 154. Unlike the prior embodiment, the NFL 140 includes a central hub 160 linking the first and second body portions 142, 144. Whereas the first and second body portions 42, 44 were connected along a line in the prior embodiment, the central hub 160 provides an area of interconnection which improves manufacturability of the NFL 140. The longitudinally facing surfaces of the central hub 160 have been depicted generally perpendicular to the longitudinal axis 14, and hence light is transmitted longitudinally therethrough. However, it will be recognized that the inner and outer longitudinally facing surfaces of the central hub 160 may be shaped to achieve any desired beam pattern, such as to direct light laterally by forming a V-shape groove in the outer longitudinally facing surface of the central hub 160.

Figure 7:
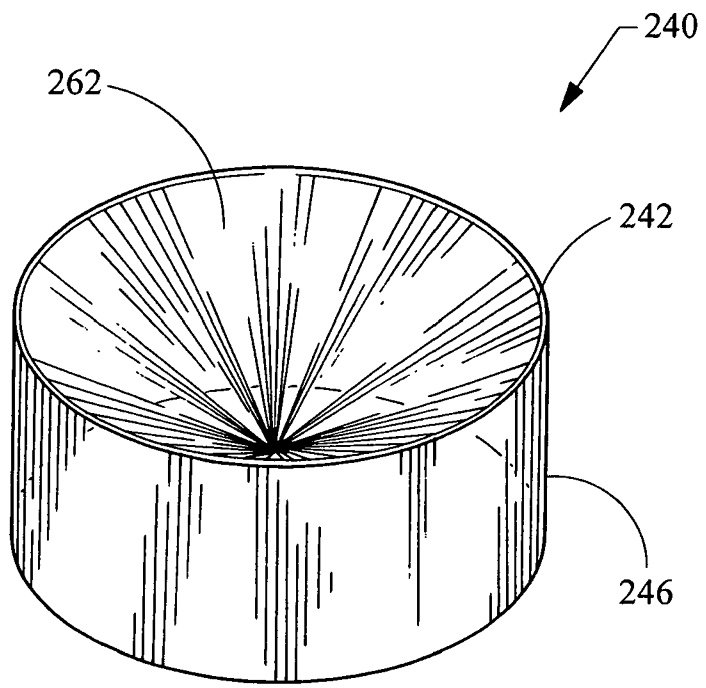
FIG. 7 is a perspective view of yet another near field lens constructed in accordance with the teachings of the present invention.
Figure 8:
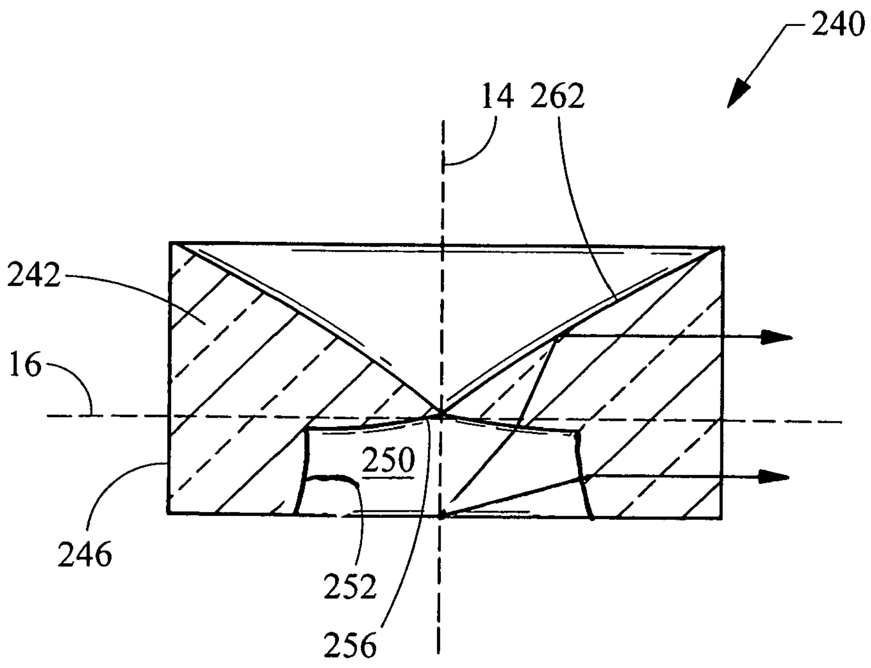
FIG. 8 is a cross-sectional view of the near field lens depicted in FIG. 7.

Another embodiment of a near field lens 240 constructed in accordance with the teachings of the present invention has been depicted in FIGS. 7 and 8. In this embodiment, the NFL

240 has a cross-sectional shape (FIG. 8) that is similar to the cross-sectional shape of the NFL 40 depicted in FIG. 3. However, in this embodiment the cross-sectional shape represents a revolution of that cross-sectional shape about the longitudinal axis 14, resulting in the disc-shaped main body 242 best seen in FIG. 7. Thus, the disc-shaped main body 242 defines a single outer longitudinally facing surface 262 and a single outer laterally facing surface 246. The pocket 250 is defined by a single inner laterally facing surface 252 and a single inner longitudinally facing surface 256. The surfaces 246, 256, 262 are structured similarly to the prior embodiment such that light entering the pocket 250 is collimated longitudinally and directed laterally out of the outer laterally facing surface 246 generally along the lateral axis 16. Surface 252 is tilted radially outwardly (about 3 degrees or greater) to improve manufacturability.

Accordingly, it will be recognized by those skilled in the art that the NFL 240 emits light along both the lateral axis 16 as well as the vertical axis 18, and specifically emits light over 360 degrees relative to the longitudinal axis 14. As with the prior embodiment, the NFL 240 permits a reduction in the lateral thickness of the NFL 240, while maintaining a small longitudinal height and providing light distribution and collection well suited for special lighting applications such as automotive functions.

Figure 9:
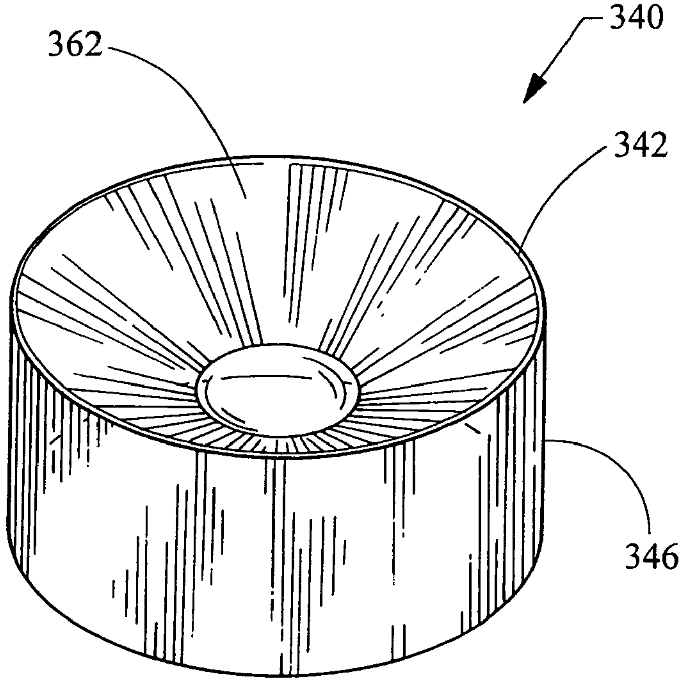
FIG. 9 is a perspective view of still yet another near field lens constructed in accordance with the teachings of the present invention.
Figure 10:
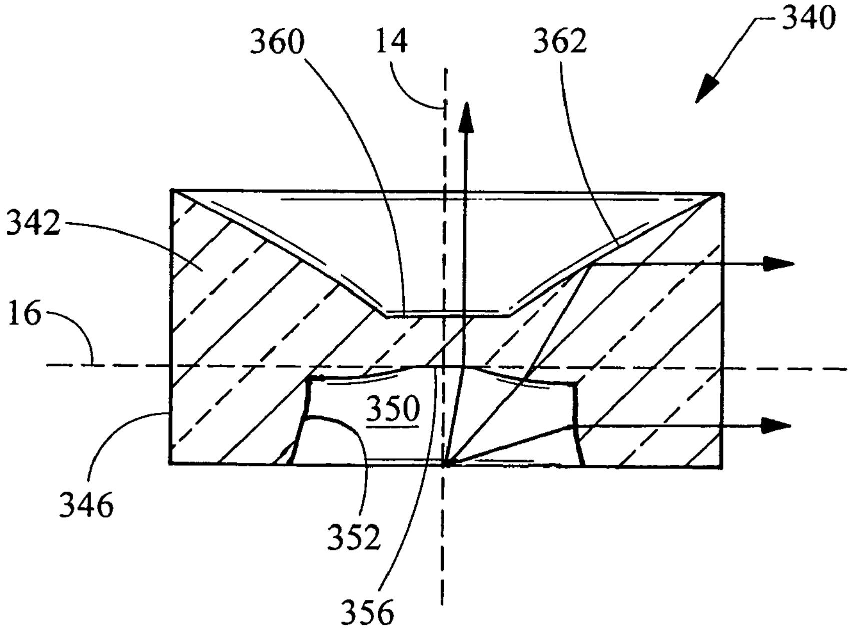
FIG. 10 is a cross-sectional view of the near field lens depicted in FIG. 9.

Turning now to FIGS. 9 and 10, perspective and cross-sectional views of another NFL 340 has been depicted in accordance with the teachings of the present invention. This NFL 340 is similarly disc-shaped as the NFL 240 of the prior embodiment, and thus includes a main body 342 defining an outer laterally facing surface 346, an outer longitudinally facing surface 362, an inner laterally facing surface 352 and an inner longitudinally facing surface 356. However, in this embodiment, and similar to the embodiment depicted in FIG. 6, the main body 342 includes a central hub 360 aligned with the longitudinal axis 14. Accordingly, the NFL 340 is easily manufactureable, and is structured to permit a portion of the light to be emitted longitudinally through the central hub 360. A majority of the light is nonetheless collected, collimated and redirected laterally along the lateral axis 16.

Figure 11:
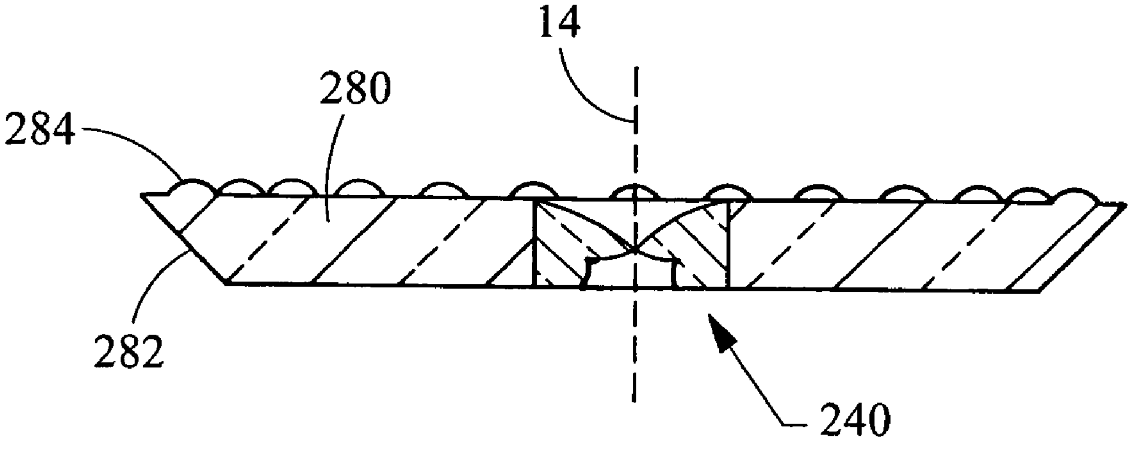
FIG. 11 is a cross-sectional view of the near field lens depicted in FIG. 8, shown connected to a light manifold.
Figure 12:
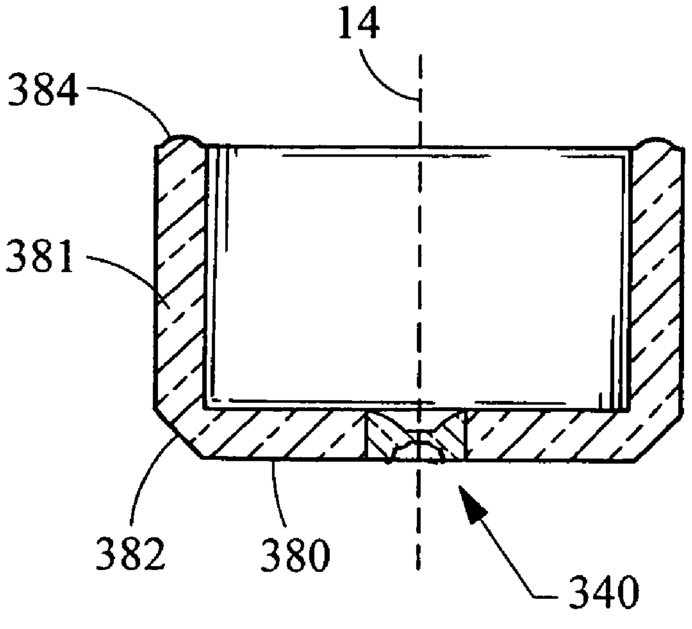
FIG. 12 is a cross-sectional view of the near field lens depicted in FIG. 10 shown applied to another light manifold.

FIGS. 11 and 12 depict the NFL 240 and NFL 340 of the prior embodiments coupled to light distribution manifolds 280, 380, respectively. In FIG. 11, the light manifold 280 includes an outer angled surface 282 which redirects light longitudinally out of an upper longitudinal surface of the manifold 280 and along the longitudinal axis 14. Here, the light manifold 280 has also been depicted as having a plurality of beam focusing optics 284 positioned above the angled outer surface 282 which provides an automotive lighting function such as stop light function. It will be recognized that numerous beam focusing or beam spreading optics may be employed on the light emitting surface of the manifold 280. In the embodiment depicted in FIG. 12, the light manifold 380 includes an angled outer surface 382 which directs light through a longitudinal extension 381 and through an outer longitudinally facing surface of the extension 381. As in the prior embodiment, the light emitting surface has been shown including a plurality of beam focusing optics 384.

It will be recognized by those skilled in the art that through the unique construction of the near field lens as described above, the size of the NFL can be significantly reduced in the lateral direction without increasing the longitudinal height of the NFL. At the same time, a beam pattern having the size and intensity desired and required for automotive applications is provided. By way of this structure, numerous benefits in cost, weight and manufacturing are achieved.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A near field lens for an automotive light assembly having a light source, the light source aligned along a longitudinal axis, the lens extending along a lateral axis perpendicular to the longitudinal axis, the lens comprising:

a main body of light transmitting material;

the main body defining an outer longitudinally facing surface and an outer laterally facing surface, the outer longitudinally facing surface structured to redirect light along the lateral axis towards the outer laterally facing surface, the outer laterally facing surface being generally parallel to the longitudinal axis; and a pocket formed in the main body for receiving light from the light source, the pocket being defined by an inner longitudinally facing surface and an inner laterally facing surface, the inner longitudinally facing surface being curved towards the pocket.

2. The near field lens of claim 1, wherein the lens collimates light longitudinally relative to the longitudinal axis.

3. The near field lens of claim 1, wherein the lens collimates light vertically relative to a vertical axis, the longitudinal, lateral and vertical axes being mutually perpendicular.

4. The near field lens of claim 1, wherein the inner longitudinally facing surface is structured to refract light towards the outer longitudinally facing surface.

5. The near field lens of claim 1, wherein the inner longitudinally facing surface is curved between an upstream location and a downstream location and wherein a tangent of the curve at the downstream location is generally parallel to the lateral axis.

6. The near field lens of claim 1, wherein the entire inner longitudinally facing surface is curved and follows a circular arc.

7. The near field lens of claim 1, wherein the inner laterally facing surface is curved towards the pocket.

8. The near field lens of claim 1, wherein the inner laterally facing surface is structured as a lens to longitudinally collimate light from the pocket.

9. The near field lens of claim 1, wherein the main body includes a central hub permitting light to pass longitudinally therethrough.

10. The near field lens of claim 1, wherein the first body portion and second body portion define inner longitudinally facing surface portions which in combination form the inner longitudinally facing surface.

11. The near field lens of claim 1, wherein the inner longitudinally facing surface has a compound curvature.

12. The near field lens of claim 1, wherein the inner laterally facing surface has a compound curvature.

13. The near field lens of claim 1, wherein the main body is disc shaped.

14. The near field lens of claim 13, wherein the main body represents a revolution about the longitudinal axis.

15. The near field lens of claim 13, wherein the main body defines a vertical axis mutually perpendicular to the longitudinal and lateral axes, and wherein the main body emits light in both the lateral and vertical directions.

16. The near field lens of claim 13, wherein the outer laterally facing surface is annular.

17. A near field lens for an automotive light assembly having a light source, the light source aligned along a longitudinal axis, the lens extending along a lateral axis perpendicular to the longitudinal axis, the lens comprising:

a main body of light transmitting material;

the main body defining an outer longitudinally facing surface and an outer laterally facing surface, the outer longitudinally facing surface structured to redirect light along the lateral axis towards the outer laterally facing surface, the main body including a first body portion and a second body portion, the first and second body portions directing light along the lateral axis in opposite directions; and a pocket formed in the main body for receiving light from the light source, the pocket being defined by an inner longitudinally facing surface and an inner laterally facing surface, the inner longitudinally facing surface being curved towards the pocket.

18. The near field lens of claim 17, wherein the first and second body portions mirror each other about the longitudinal axis.

19. The near field lens of claim 17, wherein the first body portion and second body portion define inner longitudinally facing surface portions which in combination form the inner longitudinally facing surface.

20. The near field lens of claim 17, wherein the lens collimates light longitudinally relative to the longitudinal axis.

21. The near field lens of claim 17, wherein the inner longitudinally facing surface is curved between an upstream location and a downstream location, and wherein a tangent of the curve at the downstream location is generally parallel to the lateral axis.

22. The near field lens of claim 17, wherein the inner laterally facing surface is structured as a lens to longitudinally collimate light from the pocket.

* * * * *